(12) United States Patent
Warth et al.

(10) Patent No.: US 7,105,592 B2
(45) Date of Patent: Sep. 12, 2006

(54) POLYCARBONATE MOLDING COMPOUNDS CONTAINING A SPECIAL TALC

(75) Inventors: Holger Warth, Dormagen (DE); Andreas Seidel, Dormagen (DE); Thomas Eckel, Dormagen (DE); Dieter Wittmann, Leverkusen (DE); Bernd Keller, Geldern (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/168,418

(22) PCT Filed: Dec. 12, 2000

(86) PCT No.: PCT/EP00/12563

§ 371 (c)(1),
(2), (4) Date: Jun. 21, 2002

(87) PCT Pub. No.: WO01/48087

PCT Pub. Date: Jul. 5, 2001

(65) Prior Publication Data

US 2003/0083418 A1    May 1, 2003

(30) Foreign Application Priority Data

Dec. 24, 1999 (DE) .................. 199 62 929

(51) Int. Cl.
*C08K 3/34* (2006.01)
*C08L 69/00* (2006.01)

(52) U.S. Cl. .................. 524/451; 525/67

(58) Field of Classification Search .......... 524/451
See application file for complete search history.

(56) References Cited

U.S. PATENT DOCUMENTS

| | | | | |
|---|---|---|---|---|
| 4,677,162 A | * | 6/1987 | Grigo et al. | 524/67 |
| 5,272,193 A | * | 12/1993 | Fuhr et al. | 524/140 |
| 5,679,759 A | * | 10/1997 | Wittmann et al. | 528/196 |
| 6,423,767 B1 | * | 7/2002 | Weber et al. | 524/158 |
| 6,448,316 B1 | * | 9/2002 | Hirano et al. | 524/127 |
| 6,737,465 B1 | * | 5/2004 | Seidel et al. | 524/451 |

FOREIGN PATENT DOCUMENTS

| | | |
|---|---|---|
| DE | 19 753 541 | 6/1999 |
| EP | 0 391 413 | 10/1990 |
| EP | 0 452 788 | 10/1991 |
| EP | 933396 * | 8/1999 |
| WO | 98/51737 | 11/1998 |

OTHER PUBLICATIONS

Encyclopedia of Polymer Science, vol. 1, pp. 400-401;1985.*
Mondo Minerals Product Specifications for Micro—Talc it Extra.*
Database WPI, Section Ch, Week 199731 Derwent Publication Ltd., London, GB; Class A23, AN 1997-337186 XP002167170 & JP 09 137054 A (Sumitomo Dow KK), May 27, 1997 abstract.

* cited by examiner

*Primary Examiner*—David J. Buttner
(74) *Attorney, Agent, or Firm*—Joseph C. Gil; Aron Preis

(57) ABSTRACT

A thermoplastic molding composition comprising polycarbonate resin, at least one impact modifier and highly pure talc is disclosed. The talc is characterized in that it contains $Al_2O_3$ in an amount of less than 1% relative to the weight of said talc. The composition that features high toughness, good processability and low coefficient of thermal expansion is suitable for the manufacture of exterior parts of vehicles.

8 Claims, 1 Drawing Sheet

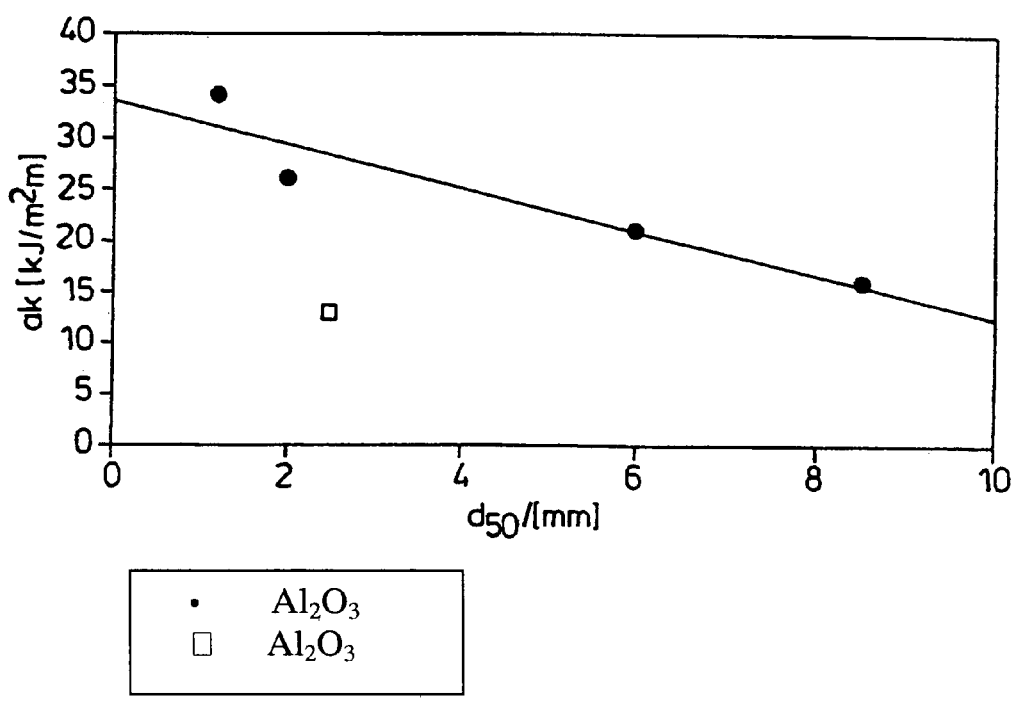

POLYCARBONATE MOLDING COMPOUNDS CONTAINING A SPECIAL TALC

The present invention relates to polycarbonate compositions filled with special talc, which are characterised by high toughness, rubber-glass transitions at low temperatures and good processability at low coefficient of thermal expansion.

Filled and/or reinforced PC/ABS moulding compositions are known.

For example, EP-A 0 391 413 describes PC/ABS moulding compositions containing inorganic fillers with special geometric properties, whereby the moulding compositions are specified by a low coefficient of linear thermal expansion, a high toughness under impact stress and a high heat resistance. Talc and non-calcined clay materials are described as fillers according to the invention.

EP-A 0 452 788 describes talc-containing PC/ABS moulding compositions characterised in particular by a matt material surface.

WO 09851737 describes mineral-filled PC/AES blends whereby 65–85 wt. % PC with 10–50 wt. % of a rubber-modified thermoplastic with 1–15 wt. % of a mineral filler are used for moulding compositions, together with applications thereof in the area of external vehicle body parts. Advantages are said to lie in the improved dimensional stability, thermal performance, notched impact resistance and flow characteristics in comparison with the prior art.

The object of the present invention is the improvement of the notched impact resistance and hence of the rubber-glass transition at low temperatures. A low rubber-glass transition is especially important for external vehicle body parts, as even at temperatures well below zero brittle splintering of the material used can lead to serious injuries in the event of an accident.

It has now been found that impact-modified polycarbonate compositions containing the special talc described below demonstrate the desired property. In particular, the range of properties of the compositions according to the invention enables them to be used in the manufacture of exterior vehicle body parts with outstanding surface quality for applications which require protection from flying splinters of material, even at low temperatures.

The present invention therefore provides polycarbonate compositions containing impact modifiers and 0.05 to 40, preferably 0.5 to 30 parts by weight, particularly preferably 1 to 20 parts by weight relative to the overall composition, of a special talc with an $Al_2O_3$ content of below 1 wt. %, preferably less than or equal to 0.9, particularly less than or equal to 0.7 wt. %, most particularly less than or equal to 0.5 wt. %, in each case relative to the talc.

Preferred polycarbonate compositions are those containing

A) 30 to 98 parts by weight, preferably 40 to 95 parts by weight, particularly preferably 45 to 90 parts by weight of at least one aromatic polycarbonate, B) 0.5 to 50, preferably 1 to 40, particularly preferably 1.5 to 30, most particularly preferably 5 to 25 parts by weight of at least one graft polymer, C) 0.05 to 40, particularly 0.5 to 30 parts by weight, particularly preferably 1 to 20 parts by weight, most particularly preferably 2 to 15 parts by weight of a talc according to the definition given here.

The sum of the parts by weight of all components (A to C and optionally further components) comes to 100.

Component A

Suitable aromatic polycarbonates and/or aromatic polyester carbonates for component A according to the invention are known from the literature or can be manufactured by methods known from the literature (for the manufacture of aromatic polycarbonates, see for example Schnell, "Chemistry and Physics of Polycarbonates", Interscience Publishers, 1964, and DE-AS 1 495 626, DE-OS 2 232 877, DE-OS 2 703 376, DE-OS 2 714 544, DE-OS 3 000 610, DE-OS 3 832 396; for the manufacture of aromatic polyester carbonates see DE-OS 3 077 934, for example).

Aromatic polycarbonates can for example be manufactured by reaction of diphenols with carbonic acid halides, preferably phosgene, and/or with aromatic dicarboxylic acid dihalides, preferably benzene dicarboxylic acid dihalides, by means of the phase interface method, optionally using chain terminators, for example monophenols, and optionally using trifunctional or more than trifunctional branching agents, for example triphenols or tetraphenols.

Diphenols for production of the aromatic polycarbonates and/or aromatic polyester carbonates are preferably those with the formula (I)

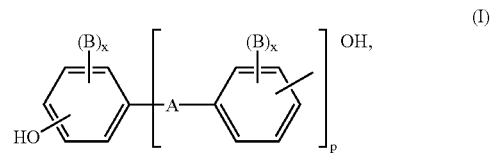

where
A is a single bond, $C_1$–$C_5$ alkylene, $C_2$–$C_5$ alkylidene, $C_5$–$C_6$ cycloalkylidene, —O—, —SO—, —CO—, —S—, —$SO_2$—, $C_6$–$C_{12}$ arylene, to which further aromatic rings optionally containing heteroatoms may be condensed, or a radical with the formula (II) or (III)

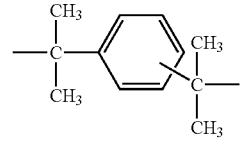

B in each case is $C_1$–$C_{12}$ alkyl, preferably methyl, halogen, preferably chlorine and/or bromine x in each case is mutually independently 0, 1 or 2, p is 1 or 0 and $R^5$ and $R^6$, which can be individually selected for each $X^1$, mutually independently denote hydrogen or $C_1$–$C_6$ alkyl, preferably hydrogen, methyl or ethyl $X^1$ denotes carbon and m denotes a whole number from 4 to 7, preferably 4 or 5, with the proviso that $R^5$ and $R^6$ are simultaneously alkyl on at least one $X^1$ atom.

Preferred diphenols are hydroquinone, resorcinol, dihydroxydiphenols, bis(hydroxyphenyl) $C_1$–$C_5$ alkanes, bis(hydroxyphenyl) $C_5$–$C_6$ cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl) diisopropylbenzenes, as well as derivatives thereof substituted in the ring with bromine and/or chlorine.

Examples of particularly preferred diphenols include 4,4'-dihydroxydiphenyl, bisphenol A, 2,4-bis(4-hydroxyphenyl)-2-methylbutane, 1,1-bis(4-hydroxyphenyl) cyclohexane, 1,1-bis(4-hydroxyphenyl)-3,3,5-trimethylcyclohexane, 4,4'-dihydroxydiphenylsulfide, 4,4'-dihydroxydiphenylsulfone and di- and tetrabrominated or chlorinated derivatives thereof, such as 2,2-bis(3-chloro-4-hydroxyphenyl) propane, 2,2-bis(3,5-dichloro-4-hydroxyphenyl) propane or 2,2-bis(3,5-dibromo-4-hydroxyphenyl) propane.

2,2-bis(4-hydroxyphenyl) propane (bisphenol A) is particularly preferred.

The diphenols may be used alone or in any mixture whatsoever.

The diphenols are known from the literature or obtainable by methods known from the literature.

Suitable chain terminators for the manufacture of the thermoplastic, aromatic polycarbonates are for example phenol, p-chlorophenol, p-tert-butyl phenol or 2,4,6-tribromophenol, but also long-chain alkyl phenols, such as 4-(1,3-tetramethylbutyl) phenol according to DE-OS 2 842 005 or monoalkyl phenol or dialkyl phenols with a total of 8 to 20 C atoms in the alkyl substituents, such as 3,5-di-tert-butyl phenol, p-iso-octyl phenol, p-tert-octyl phenol, p-dodecyl phenol and 2-(3,5-dimethylheptyl) phenol and 4-(3,5-dimethylheptyl) phenol. The quantity of chain terminators to be used is generally between 0.5 mol % and 10 mol %, relative to the molar sum of the diphenols used in each case.

The thermoplastic, aromatic polycarbonates have average weight-average molecular weights ($M_w$, measured by ultracentrifuge or light-scattering measurement, for example) of 10,000 to 200,000, preferably 15,000 to 80,000.

The thermoplastic, aromatic polycarbonates may be branched by known means, and preferably by the incorporation of 0.05 to 2.0 mol %, relative to the sum of the diphenols used, of trifunctional or more than trifunctional compounds, for example those having three and more phenolic groups.

Both homopolycarbonates and copolycarbonates are suitable. 1 to 25 wt. %, preferably 2.5 to 25 wt. % (relative to the total amount of diphenols to be used) of polydiorganosiloxanes with hydroxy aryloxy terminal groups can also be used for the manufacture of copolycarbonates for component A according to the invention. These are known (see for example U.S. Pat. No. 3,419,634) or can be manufactured by methods known from the literature. The manufacture of polydiorganosiloxane-containing copolycarbonates is described in DE-OS 3 334 782, for example.

In addition to the bisphenol A homopolycarbonates, preferred polycarbonates are the copolycarbonates of bisphenol A with up to 15 mol %, relative to the molar sum of diphenols, of other diphenols named as being preferred or particularly preferred, in particular 2,2-bis(3,5-dibromo-4-hydroxyphenyl) propane.

Aromatic dicarboxylic acid dihalides for the manufacture of aromatic polyester carbonates are preferably the di-acid dichlorides of isophthalic acid, terephthalic acid, diphenylether-4,4'-dicarboxylic acid and of naphthaline-2,6-dicarboxylic acid.

Mixtures of di-acid dichlorides of isophthalic acid and terephthalic acid in a ratio of between 1:20 and 20:1 are particularly preferred.

A carbonic acid halide, preferably phosgene as bifunctional acid derivative, is preferably also used in the manufacture of polyester carbonates.

Examples of suitable chain terminators for production of the aromatic polyester carbonates include, in addition to the monophenols already cited, chlorocarbonates thereof, as well as the acid chlorides of aromatic monocarboxylic acids, which may optionally be substituted with $C_1$–$C_{22}$ alkyl groups or with halogen atoms, and aliphatic $C_2$–$C_{22}$ monocarboxylic acid chlorides.

The quantity of chain terminators used in each case is 0.1 to 10 mol %, relative to mols of diphenols in the case of phenolic chain terminators and to mols of dicarboxylic acid dichlorides in the case of monocarboxylic acid chloride chain terminators.

The aromatic polyester carbonates may also contain incorporated aromatic hydroxycarboxylic acids.

The aromatic polyester carbonates may be both linear and branched by known means (see also DE-OS 2 940 024 and DE-OS 3 007 934 in this regard).

Examples of branching agents that can be used are tri- or polyfunctional carboxylic acid chlorides, such as trimesic acid trichloride, cyanuric acid trichloride, 3,3'-,4,4'-benzophenone tetracarboxylic acid tetrachloride, 1,4,5,8-naphthaline tetracarboxylic acid tetrachloride or pyromellitic acid tetrachloride, in quantities of 0.01 to 1.0 mol % (relative to dicarboxylic acid dichlorides used) or tri- or polyfunctional phenols, such as phloroglucinol, 4,6-dimethyl-2,4,6-tri(4-hydroxyphenyl) heptene -2,4,4-dimethyl-2,4,6-tri(4-hydroxyphenyl) heptane, 1,3,5-tri(4-hydroxyphenyl) benzene, 1,1,1-tri(4-hydroxyphenyl) ethane, tri(4-hydroxyphenyl) phenylmethane, 2,2-bis[4,4-bis(4-hydroxyphenyl) cyclohexyl] propane, 2,4-bis(4-hydroxyphenylisopropyl) phenol, tetra(4-hydroxyphenyl) methane, 2,6-bis(2-hydroxy-5-methylbenzyl)-4-methylphenol, 2-(4-hydroxyphenyl)-2-(2,4-dihydroxyphenyl) propane, tetra(4-[4-hydroxyphenylisopropyl]phenoxy) methane, 1,4-bis[4,4'-dihydroxytriphenyl)methyl] benzene, in quantities from 0.01 to 1.0 mol % relative to diphenols used. Phenolic branching agents can be used with the diphenols, acid chloride branching agents can be introduced along with the acid dichlorides.

The content of carbonate structural units in the thermoplastic, aromatic polyester carbonates can be varied as wished. The content of carbonate groups is preferably up to 100 mol %, particularly up to 80 mol %, particularly preferably up to 50 mol %, relative to the sum of ester groups and carbonate groups. Both the ester and the carbonate component of the aromatic polyester carbonates can be in the form of blocks or can be randomly distributed in the polycondensate.

The relative solution viscosity ($\eta_{rel}$) of the aromatic polycarbonates and polyester carbonates is in the range 1.18 to 1.4, preferably 1.20 to 1.32 (measured in solutions of 0.5 g polycarbonate or polyester carbonate in 100 ml methylene chloride solution at 25° C.).

The thermoplastic aromatic polycarbonates and polyester carbonates can be used alone or in any mixture whatsoever.

Component B

Component B comprises one or more graft polymers of

B.1 5 to 95, preferably 30 to 90 wt. % of at least one vinyl monomer on

B.2 95 to 5, preferably 70 to 10 wt. % of one or more graft bases with glass transition temperatures <10° C., preferably <0° C., particularly preferably <−20° C.

The graft base B.2 generally has an average particle size ($d_{50}$ value) of 0.05 to 10 µm, preferably 0.1 to 5 µm, particularly preferably 0.2 to 1 µm.

Monomers B.1 are preferably mixtures of

B.1.1 50 to 99 parts by weight of vinyl aromatics and/or vinyl aromatics substituted in the ring (such as styrene, α-methyl styrene, p-methyl styrene, p-chlorostyrene, for example) and/or methacrylic acid ($C_1$–$C_8$) alkyl esters (such as methyl methacrylate, ethyl methacrylate) and B.1.2 1 to 50 parts by weight of vinyl cyanides (unsaturated nitriles such as acrylonitrile and methacrylonitrile) and/or (meth)acrylic acid ($C_1$–$C_8$) alkyl esters (such as methyl methacrylate, n-butyl acrylate, t-butyl acrylate) and/or derivatives (such as anhydrides and imides) of unsaturated carboxylic acids (for example maleic anhydride and N-phenyl maleinimide).

Preferred monomers B.1.1 are selected from at least one of the monomers styrene, α-methyl styrene and methyl methacrylate, preferred monomers B.1.2 are selected from at least one of the monomers acrylonitrile, maleic anhydride and methyl methacrylate.

Particularly preferred monomers are B.1.1 styrene and B.1.2 acrylonitrile.

Suitable graft bases B.2 for the graft polymers B are, for example, diene rubbers, EP(D)M rubbers, i.e. those based on ethylene/propylene, and optionally diene, acrylate, polyurethane, silicone, chloroprene and ethylene/vinyl acetate rubbers.

EP(D)M rubber-based systems are particularly suitable for weather-resistant moulding compositions.

Preferred graft bases B.2 are diene rubbers (e.g. based on butadiene, isoprene, etc.) or mixtures of diene rubbers or copolymers of diene rubbers or mixtures thereof with further copolymerisable monomers (e.g. as for B.1.1 and B.1.2), with the proviso that the glass transition temperature of component B.2 is below <10° C., preferably <0° C., particularly preferably <−10° C.

Pure polybutadiene rubber is particularly preferred. EP(D)M rubber is likewise particularly preferred.

Examples of particularly preferred polymers B include ABS polymers (emulsion, bulk and suspension ABS), such as are described for example in DE-OS 2 035 390 (=U.S. Pat. No. 3,644,574) or in DE-OS 2 248 242 (=GB-PS 1 409 275) and in Ullmann, Enzyklopädie der Technischen Chemie, vol. 19 (1980), p. 280 ff. The gel content of the graft base B.2 is at least 30 wt. %, preferably at least 40 wt. % (measured in toluene).

The graft copolymers B are produced by radical polymerisation, e.g. by emulsion, suspension, solution or bulk polymerisation, preferably by emulsion or bulk polymerisation, particularly preferably by bulk polymerisation.

ABS polymers produced by redox initiation with an initiator system consisting of hydroperoxide and ascorbic acid according to U.S. Pat. No. 4,937,285 are also particularly suitable graft rubbers.

Since it is known that the graft monomers are not necessarily fully grafted onto the graft base during the grafting reaction, graft polymers B according to the invention are also understood to denote products that are obtained by (co)polymerisation of graft monomers in the presence of the graft base and are collected during recovery.

Suitable acrylate rubbers for B.2 of the polymers B are preferably polymers of acrylic acid alkyl esters, optionally with up to 40 wt. % relative to B.2 of other polymerisable, ethylenically unsaturated monomers. The preferred polymerisable acrylic acid esters include $C_1$–$C_8$ alkyl esters, for example methyl, ethyl, butyl, n-octyl and 2-ethylhexyl esters; halogen alkyl esters, preferably halogen $C_1$–$C_8$ alkyl esters such as chloroethyl acrylate, and mixtures of these monomers.

Monomers with more than one polymerisable double bond can be used for crosslinking. Preferred examples of crosslinking monomers are esters of unsaturated monocarboxylic acids with 3 to 8 C atoms and unsaturated monohydric alcohols with 3 to 12 C atoms, or saturated polyols with 2 to 4 OH groups and 2 to 20 C atoms, such as ethylene glycol dimethacrylate, allyl methacrylate, for example; polyunsaturated heterocyclic compounds, such as trivinyl and triallyl cyanurate; polyfunctional vinyl compounds, such as divinyl and trivinyl benzenes; but also triallyl phosphate and diallyl phthalate.

Preferred crosslinking monomers are allyl methacrylate, ethylene glycol methacrylate, diallyl phthalate and heterocyclic compounds exhibiting at least 3 ethylenically unsaturated groups.

Particularly preferred crosslinking monomers are the cyclic monomers triallyl cyanurate, triallyl isocyanurate, triacryloyl hexahydro-s-triazine, triallyl benzenes. The amount of crosslinked monomers is preferably 0.02 to 5, particularly 0.05 to 2 wt. %, relative to the graft base B.2.

In the case of cyclic crosslinking monomers with at least 3 ethylenically unsaturated groups, it is advantageous to limit the quantity to below 1 wt. % of the graft base B.2.

Examples of preferred "other" polymerisable, ethylenically unsaturated monomers that can optionally be used in addition to the acrylic acid esters for manufacture of the graft base B.2, include acrylonitrile, styrene, α-methyl styrene, acrylamides, vinyl $C_1$–$C_6$ alkyl ethers, methyl methacrylate, butadiene. Preferred acrylate rubbers as graft base B.2 are emulsion polymers exhibiting a gel content of at least 60 wt. %.

Other suitable graft bases according to B.2 are silicone rubbers with graft-active sites, such as are described in DE-OS 3 704 657, DE-OS 3 704 655, DE-OS 3 631 540 and DE-OS 3 631 539.

The gel content of the graft base B.2 is determined at 25° C. in a suitable solvent (M. Hoffmann, H. Krömer, R. Kuhn, Polymeranalytik I and II, Georg Thieme-Verlag, Stuttgart 1977).

The average particle size $d_{50}$ is the diameter above and below which respectively 50% of the particles lie. It can be determined by ultracentrifuge measurement (W. Scholtan, H. Lange, Kolloid, Z. und Z. Polymere 250 (1972), 782–1796).

Component C

Talc is understood to refer to a naturally occurring or synthetically manufactured talc.

Pure talc has the chemical composition 3 MgO.4SiO$_2$.H$_2$O and hence a MgO content of 31.9 wt. %, a SiO$_2$ content of 63.4 wt. % and a content of chemically bonded water of 4.8 wt. %. It is a silicate with a layered structure.

Naturally occurring talc materials generally do not display the above ideal composition as they are contaminated by partial exchange of the magnesium by other elements, by partial exchange of silicon, by aluminium for example, and/or by intergrowths with other minerals such as dolomite, magnesite and chlorite.

The special grades of talc in the sense according to the invention are distinguished by a particularly high purity, characterised by an Al$_2$O$_3$ content of below 1 wt. %, preferably less than or equal to 0.9 wt. %, particularly preferably less than or equal to 0.7 wt. %, in particular less than or equal to 0.5 wt. %. Preferred talc grades in the sense of the invention are distinguished by, in addition to their high purity ($Al_2O_3$ content), a MgO content of 28 to 35 wt. %, preferably 30 to 33 wt. %, particularly preferably 30.5 to 32 wt. %, and a $SiO_2$ content of 55 to 65 wt. %, preferably 58 to 64 wt. %, particularly preferably 60 to 62.5 wt. %.

Examples of commercial grades of talc corresponding to this definition include Naintsch A3, A7, A10, A30 and Naintsch Prever M30 from Naintsch Mineralwerke GmbH (Graz, Austria) and the grades Finntalc MO5SL, MO3, MO5 and M20SL sold by Omya GmbH (Cologne).

Particularly advantageous is the use of the talc according to the invention in the form of finely ground grades with an average maximum particle size $d_{50}$ of <20 μm, preferably <10 μm, particularly preferably <5 μm, in particular preferably <2.5 μm.

Examples of talc grades not in the sense of the invention include Naintsch SE-Standard, Naintsch SE-Super, Naintsch SE-Micro and Naintsch ST 10, 15, 20, 30 and 60, all sold by Naintsch Mineralwerke GmbH, and Westmin talc sold by Omya, MP5O-26, MP99-10, MP99-54 and M25-38 from Pfizer.

Further Additives D

The compositions according to the invention may also contain further polymers. Suitable examples are preferably vinyl (co)polymers (D.2) of at least one monomer from the group of vinyl aromatics, vinyl cyanides (unsaturated nitriles), (meth)acrylic acid ($C_1$–$C_8$) alkyl ester, unsaturated carboxylic acids and derivatives (such as anhydrides and imides) of unsaturated carboxylic acids. Particularly suitable are (co)polymers of D.2.1 50 to 99, preferably 60 to 90 parts by weight of vinyl aromatics and/or vinyl aromatics substituted in the ring, such as styrene, α-methyl styrene, p-methyl styrene, p-chlorostyrene) and/or methacrylic acid ($C_1$–$C_8$) alkyl esters such as methyl methacrylate, ethyl methacrylate, and D.2.2 1 to 50, preferably 10 to 40, parts by weight of vinyl cyanides (unsaturated nitriles) such as acrylonitrile and methacrylonitrile and/or (meth)acrylic acid ($C_1$–$C_8$) alkyl esters (such as, for example, methyl methacrylate, n-butyl acrylate, t-butyl acrylate) and/or unsaturated carboxylic acids (such as maleic acid) and/or derivatives (such as anhydrides and imides) of unsaturated carboxylic acids (for example maleic anhydride and N-phenyl maleinimide).

The (co)polymers D.2 are resinous, thermoplastic and rubber-free.

The copolymer of D.2.1 styrene and D.2.2 acrylonitrile is particularly preferred.

The (co)polymers according to D.2 are known and can be produced by radical polymerisation, particularly by emulsion, suspension, solution or bulk polymerisation. The (co)polymers according to component D.1 preferably exhibit molecular weights $M_w$ (weight-average, determined by light-scattering or sedimentation) of between 15,000 and 200,000.

Polyalkylene terephthalates (D.3) as described in EP-A-841 187 are also suitable.

Polyalkylene terephthalates produced from terephthalic acid and/or reactive derivatives thereof (e.g. dialkyl esters thereof) and ethylene glycol and/or butanediol-1,4, and mixtures of these polyalkylene terephthalates are preferred.

The compositions according to the invention preferably contain vinyl (co)polymers, polyalkylene terephthalates or mixtures hereof up to a quantity of 35, particularly preferably up to 30 wt. %, relative to the overall composition. Most particularly preferably the compositions according to the invention contain 5 to 30 wt. %, relative to the overall composition, of vinyl (co)polymer, polyalkylene terephthalate or mixtures hereof.

The moulding compositions according to the invention can contain at least one other of the conventional additives, such as anti-drip agents, lubricants and release agents, nucleating agents, antistatics, stabilisers, dyestuffs, flame retardants and pigments, as well as fillers and reinforcing materials other than talc.

The moulding compositions according to the invention containing the above components and optionally additives, are produced by mixing the relevant components by known means and melt compounding or melt extruding at temperatures of 200° C. to 300° C. in conventional units such as internal mixers, extruders and twin-shaft screws.

The individual components can be mixed by known means either in succession or simultaneously, both at around 20° C. (room temperature) and at elevated temperature.

On the basis of their excellent impact resistance and other good properties such as ESC behaviour (stress cracking resistance), rigidity, heat resistance, flowability and low-warpage properties, the thermoplastic moulding compositions according to the invention are suitable for the manufacture of all types of mouldings, particularly those with increased requirements for a rubber-glass transition at low temperatures.

The moulding compositions according to the present invention can be used for the manufacture of mouldings, particularly also with thin walls. The mouldings can be manufactured by injection moulding or extrusion, for example. Examples of mouldings that can be produced include: housing components of all types, e.g. for domestic appliances such as juice extractors, coffee machines, mixers; for office equipment such as monitors, (laptop) computers, printers and copiers. Other possible areas of use include covers and conduits for electrical installations for the building sector and components for the automotive sector (e.g. external or internal vehicle body parts). The moulding compositions can also be used in electrical engineering, e.g. for switches, sockets and circuit boards.

The invention likewise provides processes for the production of the composition, use of the composition for the manufacture of mouldings and the mouldings themselves.

EXAMPLES

Component A

Polycarbonate based on bisphenol A with a relative solution viscosity of 1.28, measured in methylene chloride at 25° C. and in a concentration of 0.5 g/100 ml.

Component B.1

Graft polymer, produced by emulsion polymerisation, of 45 parts by weight of styrene and acrylonitrile in the ratio 72:28 on 55 parts by weight of a particulate crosslinked polybutadiene rubber (average particle diameter $d_{50}$=0.3 to 0.4 μm).

Component B.2

Dow Magnum 3904, bulk ABS from Dow Chem.

Component C

C1: Westmin talc, talc from Mondo Minerals Oy (Helsinki, Finland), sold by Omya GmbH (Cologne), with a MgO content of 31 wt. %, a $SiO_2$ content of 61 wt. % and an $Al_2O_3$ content of 1.0 wt. %, $d_{50}$=2.5 μm (comparison).

C2: Finntalc M05SL, talc from Mondo Minerals Oy (Helsinki, Finland), sold by Omya GmbH (Cologne), with a MgO content of 31 wt. %, a $SiO_2$ content of 61 wt. % and an $Al_2O_3$ content of 0.3 wt. %, $d_{50}$=2 μm.

C3: Finntalc M20SL, talc from Mondo Minerals Oy with a MgO content of 31 wt. %, a $SiO_2$ content of 61 wt. % and an $Al_2O_3$ content of 0.3 wt. %, $d_{50}$=6 μm.

C4: Finntalc M30SL, talc from Mondo Minerals Oy with a MgO content of 31 wt. %, a $SiO_2$ content of 61 wt. % and an $Al_2O_3$ content of 0.3 wt. %, $d_{50}$=8.5 μm.

C5: Naintsch A3, talc from Naintsch Mineralwerke GmbH with a MgO content of 31.5 wt. %, a $SiO_2$ content of 62.0 wt. % and an $Al_2O_3$ content of 0.4 wt. %, $d_{50}$=1.2 μm.

The above chemical compositions are based on information supplied by the manufacturer. Analysis is performed by methods known from the literature (e.g. by X-ray fluorescence spectroscopy or atomic absorption spectroscopy or calorimetry).

Component D-1

Styrene-acrylonitrile copolymer with a styrene-acrylonitrile ratio of 72:28 and a limiting viscosity number of 0.55 dl/g (measured in dimethyl formamide at 20° C.).

Component D-2

Phosphite stabiliser

Component D-3

Pentaerythritol tetrastearate as release agent

Production and Testing of the Moulding Compositions According to the Invention

Components A to D are mixed in a 3 l internal mixer. The mouldings are manufactured on an injection moulding machine model Arburg 270E at 240° C.

The notched impact resistance is determined at room temperature by method ISO 180 1A using specimens measuring 80×10×4 mm.

The Vicat B softening point is determined according to DIN 53 640.

The tensile modulus of elasticity is determined according to DIN 53 457/ISO 527.

TABLE 1

Composition of the moulding compositions

| Example | A | B1 | B2 | D1 | C1 | C5 | C2 | C3 | C4 | D3 | D2 |
|---|---|---|---|---|---|---|---|---|---|---|---|
| 1 | 55.1 | 14.7 | | 22 | | | 7.4 | | | 0.7 | 0.1 |
| 2 Comparison | 55.1 | 14.7 | | 22 | 7.4 | | | | | 0.7 | 0.1 |
| 3 | 55.1 | 14.7 | | 22 | | 7.4 | | | | 0.7 | 0.1 |
| 4 | 55.1 | 14.7 | | 22 | | | | 7.4 | | 0.7 | 0.1 |
| 5 | 55.1 | 14.7 | | 22 | | | | | 7.4 | 0.7 | 0.1 |
| 6 | 55.1 | 2.7 | 34 | | | | 7.4 | | | 0.7 | 0.1 |

TABLE 2

Results

| Example | $a_k$ [kJ/m$^2$] | Rubber-glass transition [° C.] | Tensile modulus of elasticity [N/mm] | Vicat B120 [° C.] |
|---|---|---|---|---|
| 1 | 34 | −5 | 3040 | 127 |
| 2 Comparison | 13b[1] | >RT | 2920 | 126 |
| 3 | 26b | >RT | 2800 | nd[2] |
| 4 | 21b | >RT | 2826 | nd |
| 5 | 16b | >RT | 2883 | nd |
| 6 | 55 | −25 | 2960 | 126 |

[1]b = brittle
[2]nd = not determined

It is clear from Table 2 that with comparable tensile modulus of elasticity and Vicat temperature, the examples according to the invention exhibit a distinctly better impact resistance than the comparative example.

If average particle diameter is plotted against notched impact resistance (FIG. 1), an increase in notched impact resistance is found as the particle size decreases, as expected. Surprisingly, however, a higher $Al_2O_3$ content (square) even with small particle sizes leads to a clear deterioration in notched impact resistance. The use of bulk ABS (example 6) as compared with emulsion ABS (example 1) with an otherwise equal filler composition provides a further clear increase in notched impact resistance of 62% and a reduction of 20° C. in the rubber-glass transition.

The invention claimed is:

1. A thermoplastic molding composition consisting of:
   (a) 30 to 98 parts by weight of at least one aromatic polycarbonate resin;
   (b) 0.5 to 50 parts by weight of at least one ABS graft polymer prepared from,
      (b.1) 5 to 95 wt. % of a vinyl monomer comprising styrene and acrylonitrile, and
      (b.2) 5 to 95 wt. % of a graft base consisting of poly(butadiene), said graft base having,
         a glass temperature of less than 10° C.,
         an average particle size ($d_{50}$) of 0.05 to 10 μm, and
         a gel content of at least 30 wt. %;
   (c) 0.05 to 40 parts by weight of highly pure talc containing $Al_2O_3$ in an amount of less than or equal to 0.7 % relative to the weight of said talc, and said talc having a maximum average particle size ($d_{50}$) of less than 20 μm; and
   (d) optionally at least one additive selected from the group consisting of lubricant, release agent, nucleating agent, antistatic, stabilizer, dyestuff, pigment, filler and reinforcing agent excluding talc,
wherein said molding composition has a total parts by weight of 100 parts by weight, and said ABS graft polymer is bulk ABS graft polymer.

2. The composition of claim 1 wherein said aromatic polycarbonate is present in an amount of 40 to 98 parts by weight relative to the weight of the composition.

3. The composition of claim 1 wherein said talc has an MgO content of 30–33 %, an $SiO_2$ content of 58 to 64 %, and an $Al_2O_3$ content of less than or equal to 0.7 %, the percents in all occurrences being relative to the weight of the talc.

4. The composition of claim 1 wherein the $Al_2O_3$ content of said talc is less than or equal to 0.5 wt. %.

5. The composition of claim 1 wherein the $Al_2O_3$ content of said talc is <0.7 %.

6. The thermoplastic molding composition of claim 1 wherein said composition consists of,
   50 to 90 parts by weight of said aromatic polycarbonate,
   1.5 to 25 parts by weight of said ABS graft polymer, and
   1 to 20 % of said highly pure talc, wherein said highly pure talc has, an MgO content of 30–33 wt. %, an $SiO_2$ content of 58 to 64 wt. %, and an $Al_2O_3$ content of less than or equal to 0.7 wt. %, the wt. percents, all occurrences, being relative to the weight of the talc.

7. A method of using the molding composition of claim 1 comprising manufacturing a molded article.

8. A molded article comprising the composition of claim 1.

* * * * *